March 25, 1924.
R. R. LORENZ
1,487,868
FIGURE POLYCYCLE
Filed Feb. 3, 1923
2 Sheets-Sheet 1
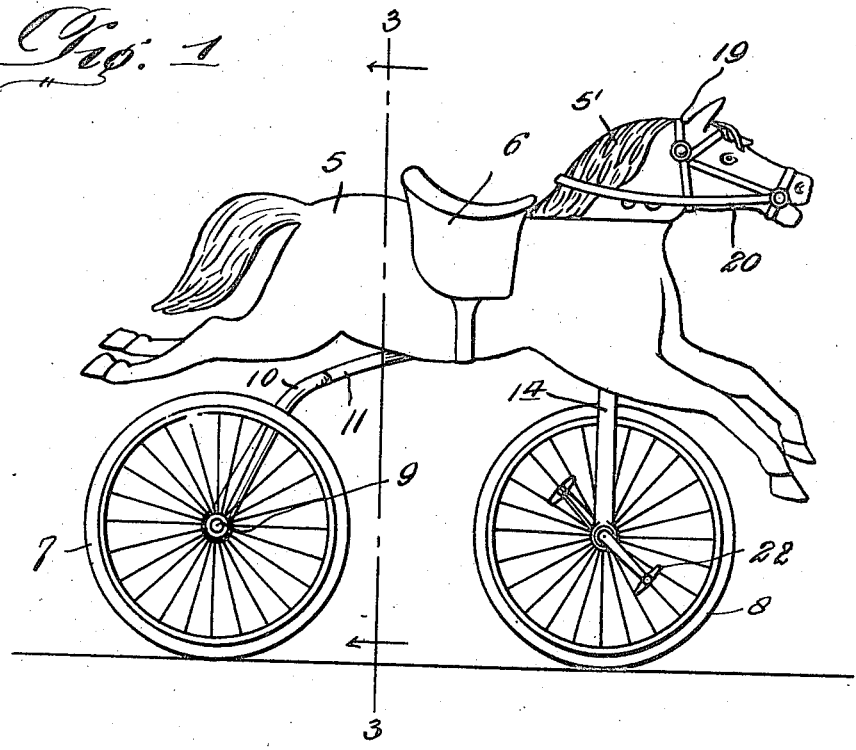
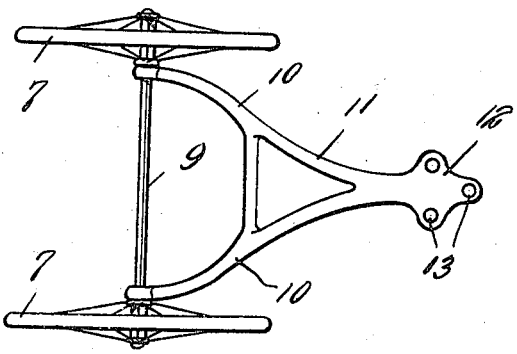
Witnesses:
F. L. Fox,
N. Berman
R. R. Lorenz,
Inventor
Clarence O'Brien.
Attorney

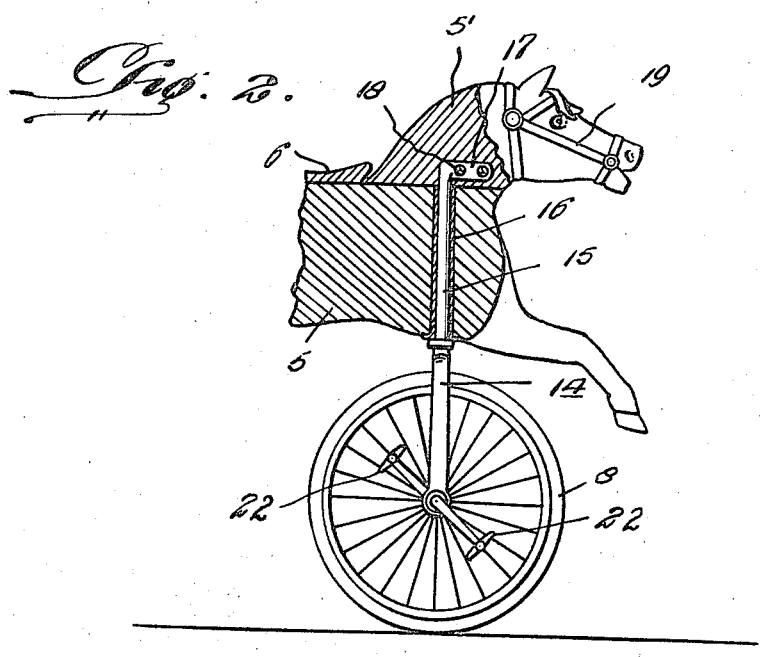
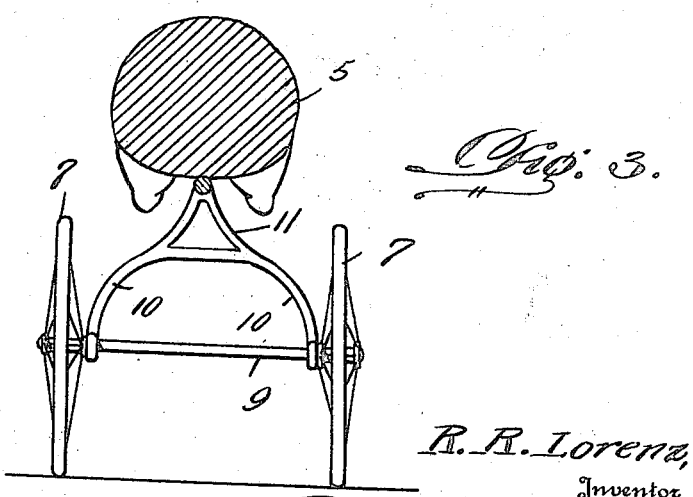

Patented Mar. 25, 1924.

1,487,868

UNITED STATES PATENT OFFICE.

RAYMOND R. LORENZ, OF PALMYRA, NEBRASKA.

FIGURE POLYCYCLE.

Application filed February 3, 1923. Serial No. 616,644.

*To all whom it may concern:*

Be it known that I, RAYMOND R. LORENZ, a citizen of the United States, residing at Palmyra, in the county of Otoe and State of Nebraska, have invented certain new and useful Improvements in Figure Polycycles, of which the following is a specification.

My invention relates to improvements in polycycles of the figure type and has for the primary object thereof, the provision of such a device that is a substantial improvement over similar polycycles now upon the market.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

In the drawings forming part of this application, like numerals of reference indicate similar parts in the several views, and wherein:—

Figure 1 is an elevational view of one side of a polycycle constructed in accordance with the present invention.

Figure 2 is a fragmentary cross sectional view of the front end of the body of my polycycle disclosing more clearly, the specific mounting of the front steering and supporting wheel, together with the means for controlling the guiding movement of the same.

Figure 3 is a vertical transverse cross sectional view upon the line 3—3 of Figure 1, and looking rearwardly in the direction of the arrows, and Figure 4 is a top plan view of the rear supporting wheels per se, together with the connecting means between the axle of these wheels, and the main body of my polycycle.

With specific reference to the drawings, my invention includes the provision of a supporting body 5, which is in the general configuration of a horse having a saddle 6 formed or otherwise secured upon the top side thereof for effecting a comfortable seat for the person operating or riding upon my device. This figure body 5 is supported by a pair of rear rubber tired wheels 7 and a front rubber tired steering and propulsion wheel 8. The rear supporting wheels 7 are carried upon opposite ends of an axle 9 and engaging over this axle 9, and inwardly of each of the wheels 7 are the legs 10 of the forked end of a downwardly extending supporting member 11. The upper end of this supporting member is bent forwardly as more clearly shown in Figure 1, and is formed at its free end with a plate 12 within which are formed openings 13, whereby the same may be secured by bolts or the like, to the underside of the body 5.

The front steering and propulsion wheel 8 rotates within the forked end 14 of a vertical standard 15, this standard 15 being in the form of a rod, which engages upwardly through a bearing sleeve 16 within a vertical opening in the body 5. The upper end of this standard 15 projects outwardly of the top surface of the body 5, and has a right angularly extending portion, in the form of a plate 17, formed thereon, which plate is embedded within the head 5′ of the main body portion 5, and is secured therein as at 18. This head 5′ is freely rotatable upon the front end of the body 5, and it will at once be apparent that any rotation of this head will rotate the standard 15 for consequently controlling the movement of the wheel 8 for guiding the polycycle. The head 5′ is further provided with the usual halter 19, having the guide rein 20 secured thereto, adapted to be held in the hands of the operator for controlling the movement of the said head.

The wheel 8 is of course rotated by the usual crank and pedal mechanism 22 and while I have herein shown and described the preferred embodiment of the present invention, it is nevertheless to be understood that minor changes may be made therein, without departing from the spirit and scope of the invention as claimed.

What I claim as new is:—

A toy comprising a body simulating that of a quadruped animal, a fork applied at one end to the intermediate portion of the trunk of the animal figure and disposed downwardly and rearwardly, a wheel journaled in said fork, a sleeve passing vertically and transversely through the forward portion of the body, a standard journaled in the sleeve and provided at its upper end with an angularly disposed extremity, a figure representing a head mounted upon said extremity and the upper end of the standard and disposed over the upper end of the sleeve, said extremity being disposed longitudinally with relation to the figure head, guiding members connected with the forward portion of the figure head and disposed around the rear portion thereof, a fork carried at the lower end of the standard, a wheel journaled in the last mentioned fork, and pedals connected with the last mentioned wheel.

In testimony whereof I affix my signature.

RAYMOND R. LORENZ.